W. S. PROSKEY.
RUNNING GEAR FOR AUTOMOBILES AND OTHER VEHICLES.
APPLICATION FILED APR. 24, 1915.
1,243,217.
Patented Oct. 16, 1917.
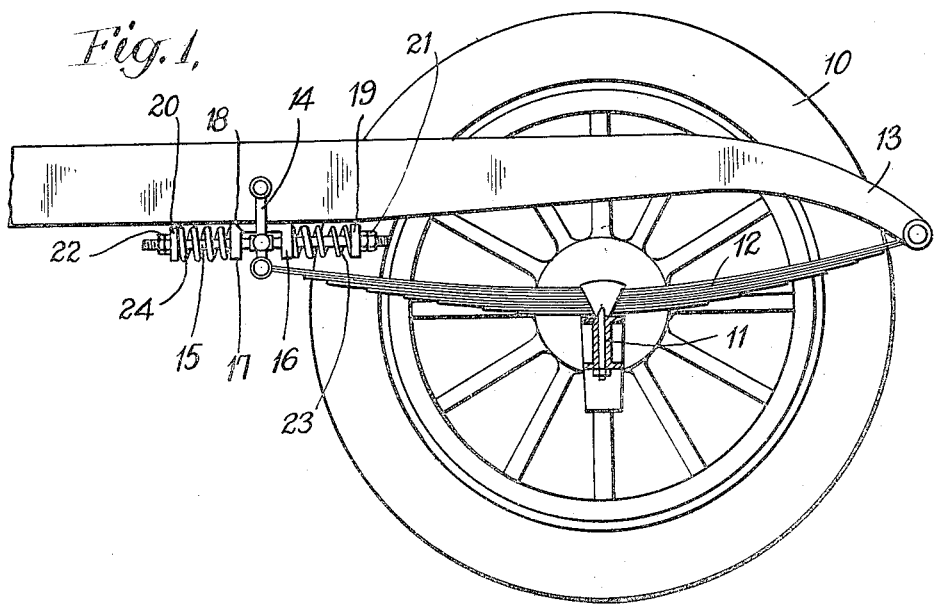
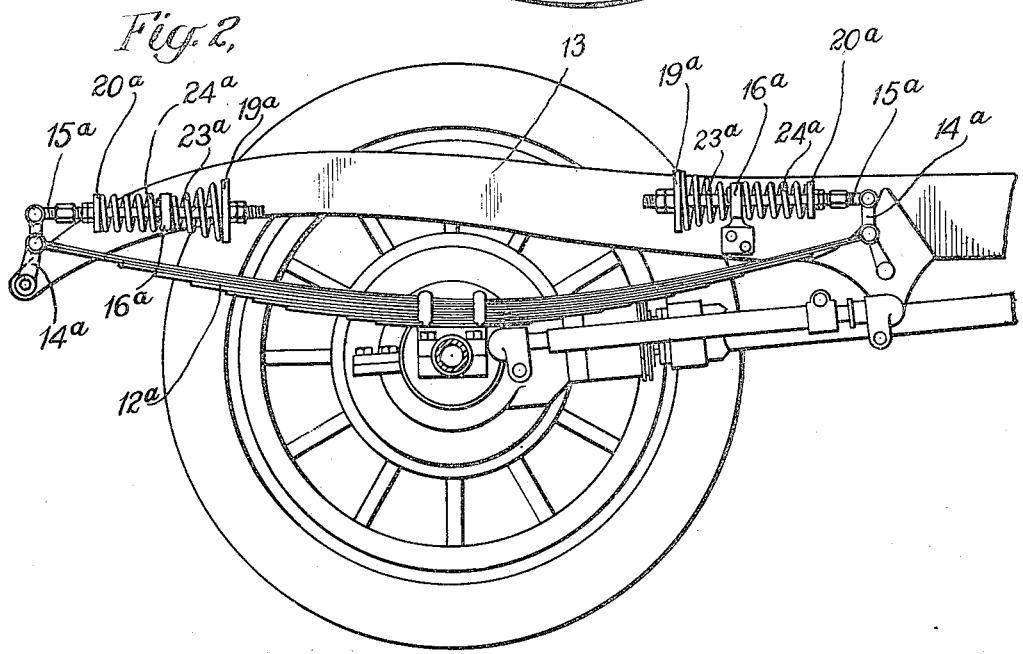
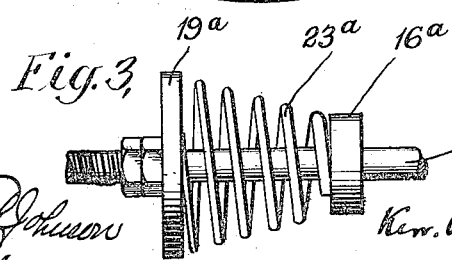
WITNESSES
INVENTOR
W. S. Proskey
BY
his ATTORNEYS

UNITED STATES PATENT OFFICE.

WINFIELD SCOTT PROSKEY, OF RENO, NEVADA.

RUNNING-GEAR FOR AUTOMOBILES AND OTHER VEHICLES.

1,243,217.             Specification of Letters Patent.        Patented Oct. 16, 1917.

Application filed April 24, 1915. Serial No. 23,553.

*To all whom it may concern:*

Be it known that I, WINFIELD SCOTT PROSKEY, a citizen of the United States, residing at Reno, in the county of Washoe and State of Nevada, have invented certain new and useful Improvements in Running-Gear for Automobiles and other Vehicles, of which the following is a full, clear, and exact description.

This invention relates to spring running gear for automobiles and other vehicles, and its chief object is to improve the "riding qualities" of the vehicle, providing for the purpose a novel construction and arrangement of springs. To this and other ends the invention consists in the novel features of construction and combinations of elements hereinafter described.

My invention contemplates the use of a yielding or flexible connection between the vehicle body and the axle, comprising two yielding arms or members extending forwardly and rearwardly from the axle, connected to the latter at their inner ends and to the vehicle body at their outer ends. In the preferred embodiment, described more fully hereinafter, these members or arms, adapted to swing in a vertical plane, take the form of a semi-elliptical or leaf spring instead of the form disclosed in my copending application Ser. No. 866,749, in which the aforesaid arms or members are in the form of inflexible rods extending forwardly and rearwardly from the axle and pivoted thereto at their inner ends so as to have the desired swinging movement in a vertical plane. In both cases the connection between the arms or members is made by means of springs, preferably of the helical or coil type, arranged to act horizontally as the outer ends of the swinging or flexing arms move outwardly. In the present invention the outward movement is aided by the provision of auxiliary springs having an initial tension, with results similar, in some respects at least, to those which would flow from making the arm of the leaf spring weaker or more flexible. My invention also contemplates the provision of secondary auxiliary springs to oppose the action of the other or primary auxiliary springs, the secondary springs being preferably of a type in which the "tension" increases faster than the "compression," technically so-called. Hereinafter the term "differential" is used as being conveniently descriptive of such a spring.

One form of the invention as applied to an automobile is illustrated in the accompanying drawing, in which—

Figure 1 shows the preferred arrangement for the front wheels. Fig. 2 shows the preferred arrangement for the rear wheels. Fig. 3 is a detail view of one of the auxiliary springs.

Referring to Fig. 1, 10 designates one of the front wheels and 11 the front axle. 12 is a semi-elliptical leaf-spring of ordinary type, having its forward end pivotally connected in the usual manner to the adjacent end of the chassis side-member 13. The rear end of the spring is pivoted to the bottom of a lever 14 pivoted at its top to the side-member 13. The lever 14 may take the form of a shackle or a clevis, with its arms extending upwardly and embracing the member 13. Between its top and bottom the lever is connected to a horizontal rod 15 extending forwardly and rearwardly through and freely movable in front and rear stops 16, 17 depending from a plate 18 securely fastened on the underside of the chassis side-member 13. On the ends of the rod are two stops 19, 20, held, and adjusted, by nuts 21, 22; and between the adjustable stops just mentioned, and the fixed stops 16, 17, are two springs 23, 24, preferably of the helical type shown. The spring 24 is under an initial compression (as by screwing up the nuts 22) and the spring 23 may be also but if so its compression is less than that of the other. The net result is that the lever 14 tends to swing clockwise and hence exerts a continual pull on the end of the leaf spring 12. Spring 23, however, does not obey the law of ordinary springs, which is that the tension varies directly as the compression. On the contrary, spring 23 is so designed or arranged that the tension increases faster than the compression. For this purpose the spring may be made of tapering "wire," as in Fig. 1, or it may be coiled in the form of a cone, as in Fig. 3, or both, as is also shown in Fig. 3. But it is to be understood that I do not limit myself to any of these methods, as other schemes may be employed with the same or other types of springs.

Now when the wheel strikes an obstruction in the roadway the first effect is to throw the wheel up, flattening spring 12 (increasing its tension) and hence causing its rear end to move rearwardly. This flattening and rearward movement are aided by the expansion spring 24 (already under tension) against the initially light or zero tension of spring 23. If, and as soon as, the combined tension of the three springs exceeds the weight and inertia of the load the car body also rises. This gives the body an upward impetus; so that as the upward movement of the wheel ceases or slackens, the body continues its movement, or, in other words, moves upward relatively to the wheel. When the wheel begins to move down again, it leaves the body. Then the body follows. Now consider: the wheel can move down only till it regains the level of the roadway; hence its motion is suddenly arrested, so that the downward movement of the body relative to the wheel suddenly becomes greatly increased, tending to flatten the spring 12,—which, to a degree, it does. Ordinarily this downward movement of the body, due to its excessive inertia, is sudden and violent, and is what is commonly referred to as the "rebound"; but in my invention it is "eased off" by the increasing tension of spring 23, with the result that the rebound is gradually checked. Nevertheless the body does move down relatively to the wheels, and does not stay up momentarily and then sink slowly as is the case with friction or fluid "shock-absorbers"; but it sinks more slowly and comes to its initial position more gently than is the case where only a leaf spring 12 is relied upon. Moreover, since the body is restored to initial position, relative to the wheel, more quickly than when friction or fluid checking devices are used, the springs are more quickly restored to position for taking care of the next obstruction, which, of course, may be immediately in advance of the first.

The above is the best explanation I am able to give for the action of the springs; but whether the theory is correct or not, the fact remains that the "riding qualities" are markedly better than where fluid or friction checking devices are relied upon to check or diminish the rebound.

The forward end of the spring can also be equipped with auxiliary springs like the rear end, but as the front seat of the car always rides easier than the rear seat the arrangement illustrated is usually sufficient. But on the rear springs I prefer to have both ends equipped. The equipment for each end of the rear spring may be like that shown at the rear of the front spring in Fig. 1, or it may be otherwise arranged; for example, as in Fig. 2. Here the horizontal rods 15ᵃ movable freely through the stops 16ᵃ fixed on the chassis side-member 13 are provided with adjustable stops 19ᵃ, 20ᵃ and are connected to the free ends of the levers 14ᵃ, instead of between the ends as in Fig. 1. Springs 24ᵃ are under initial compression, like springs 24 in Fig. 1, and springs 23ᵃ are of the differential type, that is, the tension increases faster than the compression, as is the case with the corresponding spring 23 in Fig. 1. It will be observed that with the leaf spring 12ᵃ connected between the ends of lever 14ᵃ the movement of rod 15ᵃ produced by flexure of spring 12ᵃ is greater than the movement of rod 15 produced by an equal flexure of spring 12. Conversely, the pull of compressed springs 24ᵃ on the leaf spring is greater than would be the case if the connections were as in Fig. 1. It will be understood that the arrangement illustrated in Fig. 2 can be used on the front springs, if desired, in lieu of that shown in Fig. 1. So far as I have been able to observe, the action in the two arrangements is the same.

The most important feature, according to my present observation and belief, is the compressed spring (24 and 24ᵃ) which aids the flattening of the leaf spring, or, in other words, aids the outward movement of the end of the leaf spring. This has the effect, in a sense, of weakening the leaf spring, or of making it more flexible and would, naturally, increase the length of the "rebound" but for the spring 23 (or 23ᵃ) which is preferably of a differential type, its tension increasing at a faster rate than its compression. An ordinary spring may be used as the rebound or recoil spring within the spirit of my invention.

The drawings show the equipment on only one side of the vehicle, but it will of course be understood that both sides are equipped.

It is to be understood that the invention is not limited to the construction herein specifically illustrated and described, but is capable of embodiment in other forms without departure from its spirit.

I claim:

1. The combination with a vehicle body, an axle, and a pair of arms extending forwardly and rearwardly from the axle and adapted to swing vertically, of a pair of oppositely acting horizontal springs connected to the vehicle body and to the outer end of one of said arms, one of said springs being compressed by outward movement of the end of the arm and being of a differential type, whereby its tension increases faster than its compression.

2. The combination with a vehicle body, an axle, and a pair of arms extending forwardly and rearwardly from the axle and adapted to flex in vertical planes, of a horizontally acting spring connected to the body and to the outer end of one of said arms to oppose outward movement of such end and adapted to have its tension increase at a faster rate than its compression.

3. The combination with a vehicle body, an axle, and a leaf spring, of a horizontally acting auxiliary spring connected to the body and to one end of the leaf spring to be tensioned as the latter flexes downwardly and having its tension increasing faster than its compression.

4. The combination with a vehicle body, an axle, and a leaf spring, of a pair of oppositely and horizontally acting auxiliary springs connected to the body and to one end of the leaf spring, one auxiliary spring having an initial tension to aid downward flexure of the leaf spring and the other opposing such flexure with a tension increasing faster than the compression.

5. The combination with a vehicle body, an axle, and a leaf spring, of a pair of horizontally arranged and alined coil springs, abutment means carried by the vehicle body for one end of each coil spring, a horizontally movable rod having stops for the other ends of the coil springs, and a lever pivotally connected to the vehicle body, to substantially the middle of the horizontal rod, and to one end of the leaf spring.

In testimony whereof I hereunto affix my signature.

WINFIELD SCOTT PROSKEY.